United States Patent [19]

Wright

[11] Patent Number: 4,805,055
[45] Date of Patent: Feb. 14, 1989

[54] WINCHESTER DISC DRIVE ACTUATOR STRUCTURE

[75] Inventor: Harold T. Wright, San Carlos, Calif.
[73] Assignee: Maxtor, San Jose, Calif.
[21] Appl. No.: 893,955
[22] Filed: Oct. 20, 1986

Related U.S. Application Data

[62] Division of Ser. No. 444,465, Nov. 24, 1986, abandoned.

[51] Int. Cl.⁴ .............................................. G11B 5/55
[52] U.S. Cl. ................... 360/106; 360/97.01
[58] Field of Search .................................. 360/97–99, 360/105, 106

[56] References Cited

U.S. PATENT DOCUMENTS

| | | | |
|---|---|---|---|
| 4,131,921 | 12/1978 | Gruczelak | 360/106 |
| 4,300,176 | 11/1981 | Gilovich et al. | 360/105 |
| 4,352,133 | 9/1982 | Hager | 360/106 |

FOREIGN PATENT DOCUMENTS

| | | | |
|---|---|---|---|
| 55-70971 | 5/1980 | Japan | 360/106 |
| 55-67975 | 5/1980 | Japan | 360/106 |
| 1440455 | 6/1976 | United Kingdom | 360/106 |

OTHER PUBLICATIONS

Swartz, "Motor in spinde gives micro-Winchester room for 140M bytes," Disk Drives, pp. 143-148.
Troke et al., "An Actuator Transit Latch," IBM TDB, pp. 1986-1987, vol. 20, No. 5, Oct. 1977.
Cuzner et al., "Recording and/or Reproducing Head Assembly," IBM TDB, p. 3385, vol. 16, No. 10, Mar. 1974.

Primary Examiner—John H. Wolff
Assistant Examiner—Matthew J. Bussan
Attorney, Agent, or Firm—Blakely, Sokoloff, Taylor & Zafman

[57] ABSTRACT

A Winchester disc spindle construction provides a spindle motor coil wound around laminated formed annular plates and having lead wires extending through a central stationary shaft. Surrounding a spindle coil is a cylinder having a pocket for arcuate permanent magnets. The discs are fixed to and rotated by the cylinder. Relatively large bearings support the cylinder concentric with the shaft and give increased strength to the structure, permitting more discs to be supported in equivalent space, as compared with prior structures. The arms carrying the read-write heads are mounted on a stack of spaced-apart arms pivotted at a distance from the discs so that the heads move along a shallow arc to reduce skewing of the heads relative to the recording tracks of the discs. To reduce overall size of the drive structure (and permit such shallow arc movement) the arm actuator coil is fixed to the arms with its major axis parallel to the pivot axis, as contrasted with prior structures where the major axis of the coil is transverse to the pivot axis. The arms are statically balanced for improved action. A latch to hold the arms stationary when power is off and over-travel limit means are provided.

17 Claims, 3 Drawing Sheets

WINCHESTER DISC DRIVE ACTUATOR STRUCTURE

This is a (divisional) of application Ser. No. 444,465 filed 11/24/86, abandoned.

This invention relates to a new and improved "Winchester" disc drive structure.

BACKGROUND OF THE INVENTION

1. Field of the Invention

The invention relates to improvements in the mechanical structure of the spindle which rotates Winchester discs and in the actuator for the arms which carry the read-write heads.

2. Description of the Prior Art

Winchester disc drives have been used in the computer industry for many years. The discs have been rotated by a spindle driven by a spindle motor. In most instances, the motor driving the spindle shaft has been located below the shaft, increasing the height of the assembly. In at least one instance, the motor has been incorporated in the spindle hub, but in such a way that the shaft rotates in bearings inside a boss fixed to, or fastened to, the base. This necessitated small bearings between the shaft and the boss. The present invention is an improvement on motor-in-spindle hub construction in that the field coils and magnets are reduced in diameter and relatively large bearings are provided improving the strength of the structure and permitting more discs to be stacked on a spindle of given height.

The heads have been mounted on arms either of a linear movement type or a pivotal movement type, the latter being the field of the present invention. The actuator which moves the head mounting arm has in the past had a coil having its major axis perpendicular to the axis of the pivot. This has considerably increased the overall length of the actuator and decreased the mass of copper which has been incorporated in the structure, correspondingly reducing the motor force.

SUMMARY OF THE INVENTION

The disc spindle is rotatable about a stationary shaft to which laminated plates and the windings of the spindle coil are fixed. The height of the plates and spindle coil in the direction of the shaft axis is sufficiently small to permit large bearings to be installed on either end of the coil. Surrounding the coil and the bearings is a annular cylinder supported relative to the shaft by the bearings. A pocket is formed in the interior of the cylinder to receive permanent magnets which interact with the motor stator. The discs are supported in a stack on the exterior of the cylinder. By this construction, larger bearings may be used than in conventional mountings and this permits more discs in the stack and yet provides a stable structure.

Winchester discs have recording tracks on both surfaces which are read and written thereon by heads. Linear actuation of such heads has been used in the past, but the mountings and actuation of such mechanisms had inherent disadvantages (particularly static balance) as compared with the present invention. The present invention uses arms which are pivotted about an axis parallel to the axis of the rotation of the discs. The arms are located above, below and intermediate the discs and the intermediate discs had two heads, one reading the underside of one disc and the other reading the upper side of the adjacent disc. The pivot shaft has been located as far from the discs as practical in order to increase the radius of the arc along which the heads travel, because this reduces the skewing of the head relative to the recording tracks. The coil of the actuator motor in the present invention is parallel to the pivot axis reducing the length of the actuator. The present invention reduces the length of the rear portion of the arms by employing an actuating coil mounted on the ends of the arms remote from the heads characterized by the fact that the coil has its major axis parallel to the pivot axis. Hence the space occupied by the arm actuator is materially reduced. In addition, means is provided on the arms for counterweights which statically balance the arms, thereby reducing or eliminating susceptibility to induced external or internal vibration. Such balancing is not feasible with linear actuators. As also pointed out in the accompanying specification, a latch is provided engageable with one of the arms to hold the arm structure stationary when power is off. Additionally, an overrun limit engages stops on one of the arms to prevent excess movement of the arms in either direction.

Other objects of the present invention will become apparent upon reading the following specification and referring to the accompanying drawings in which similar characters of reference represent corresponding parts in each of the several views:

DESCRIPTION OF THE PREFERRED EMBODIMENT

Figure 1:
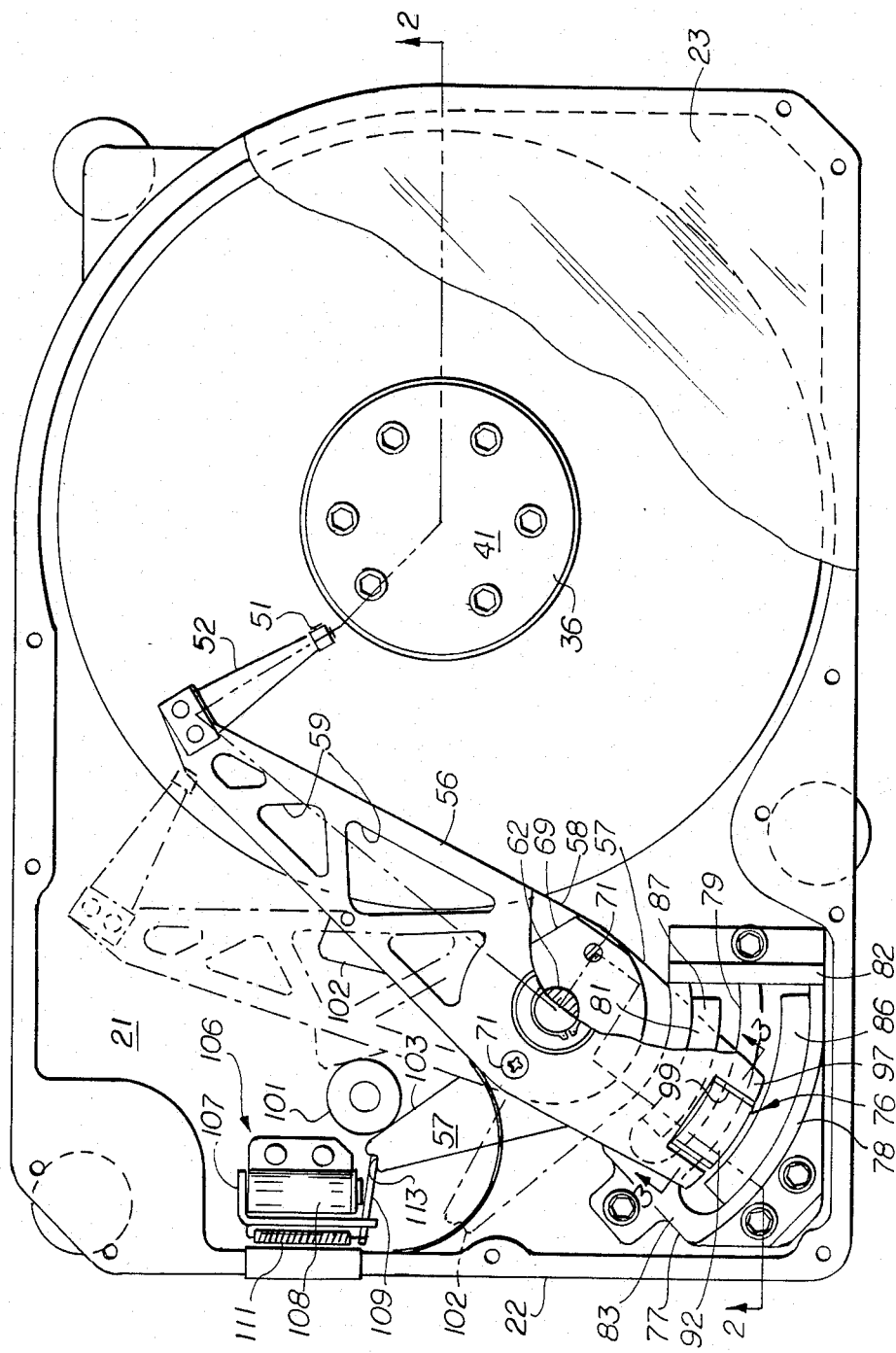
FIG. 1 is a top plan.

The mechanisms hereinafter described are contained within a housing having a base 21 which is hereinafter described as being on the bottom of the device, it being understood that the eventual mounting of the device in the equipment in which it is installed may result in the base 21 being horizontal, vertical, or in other position. Base 21 has an upstanding, substantially rectangular peripheral flange 22 extending up the entire height of the mechanism and a cover 23, which may be transparent, enclosed the top of the housing. A circuit board 25 containing electrical components may be secured below base 21.

Hub 24 on the bottom of base 21 receives and supports a vertical motor shaft 26 which supports the stator of the spindle drive motor, said stator being formed of a stack of laminated plates 27 formed with circular arc cutouts distributed around the periphery through which the copper wire windings 29 extend, all as well understood in the electric motor art. In the embodiment illustrated, shaft 26 has a hole in one end for at least a portion of its length and a radial hole 30 is provided therein for the terminals of the windings 29 which extend down through the shaft 26 and out through the hub 24. Other means for the winding may be extended from the shaft may be used. These wirings are not shown since they are well understood in the art.

Top bearing 31 is positioned above the windings and bottom bearing 32 below, with spacers 33 interposed between the respective bearings and the windings 29. A feature of the invention is the fact that the motor has a stator fixed to the stationary central shaft rigidly mounted in boss 24, permitting large size bearings 31 and 32 to be used to support the rotor. A seal 34 is placed below the lower bearing 32 and a pair of belleville washers 36 is placed above the bearing 31, to provide axial pre-load.

Surrounding the stator of the spindle drive motor is a hollow cylinder 37 formed with a circular pocket 38 on its interior intermediate its length. Installed within the pocket 38 are the rotor magnets 39, here shown to be four arcuate ceramic magnets which are bonded in pocket 38. Cap 41 closes off the upper end of the cylinder 37 and functions as a clamp to clamp the discs 43 in place.

Figure 2:
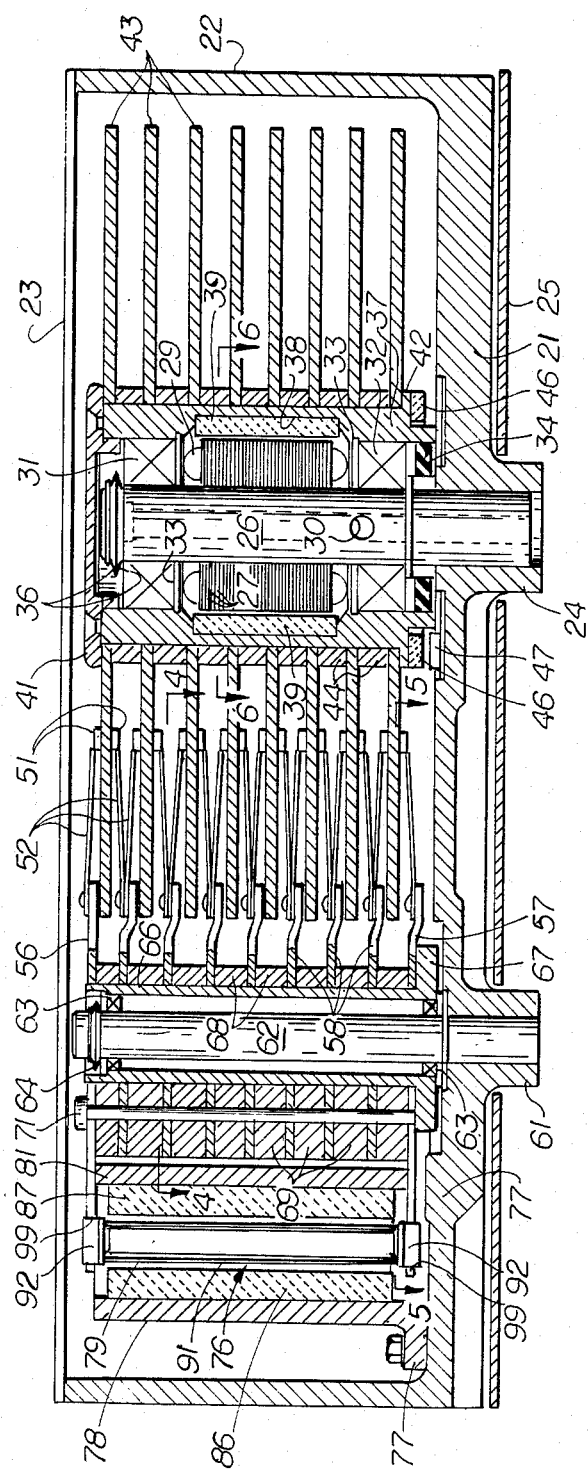
FIG. 2 is a sectional view taken substantially along line 2—2 of FIG. 1.

On the bottom of cylinder 37 is a peripheral flange 42 against which the lowermost of a plurality of Winchester discs 43 seats. The discs 43 are spaced apart by annular spacers 44 surrounding cylinder 37. As shown in FIG. 2 there are eight discs 43, which is a large number of discs, as contrasted with prior art, for a spindle of the height herein illustrated. It will be understood, however, that the number of discs 43 may be increased or decreased within the purview of the present invention. The increased bearing sizes contrasted with prior structures gives better support of the cylinder 37 permitting more discs 43 to be used than in prior structures. Below cylinder 37 is a commutation magnet 46 and mounted on base 21 below magnet 46 are "Hall Effect" sensors 47.

For each surface for each disc 43, there is a head 51 supported on the outer end of a flexible arm 52. The heads 51 are actuated by means hereinafter explained, to magnetically engage recording tracks on both surfaces of the discs 43, the heads moving between adjacent the outer periphery of the discs to adjacent the spacers 44. Inner positions of the heads 51 are shown in solid lines if FIG. 1 and outer positions are shown in phantom lines.

The uppermost head 51, which engages the recording tracks on the top surface of the uppermost disc 43, is supported by top arm 56. The lowermost head 51, which reads the recording tracks on the bottom surface of lowermost disc 43 is supported by bottom arm 57. There are, for the eight discs shown in FIG. 2, seven intermediate arms 58, each carrying two flexible arms 52, the latter carrying heads 51 which engage the under surface of one disc and the top surface of the next lowermost disc. The arms 56-58 are all mounted for oscillatory movement about pivot shaft 62 which fits into hub 61 on the bottom of base 21. Surrounding pivot shaft 62 is a hollow cylinder 66 with bearings 63 interposed between the shaft 62 and the cylinder 66 and held in place by retainer 64.

Cylinder 66 has a peripheral bottom shoulder 67 against which the bottommost arm 58 rests and a plurality of annular spacers 68 space the arms 56-58 apart in a vertical stack. Spacers 68 have extensions away from shaft 62 which function as counterweights 69. The mass of the counterweights 69 may be varied in order to statically balance the arms 56-58 about the pivot shaft 62. Vertical bolts 71, or other means, passing through the spacers 68 hold the same in place. The lower ends of bolts 71 may be threaded into appropriate holes in shoulder 67.

Figure 3:
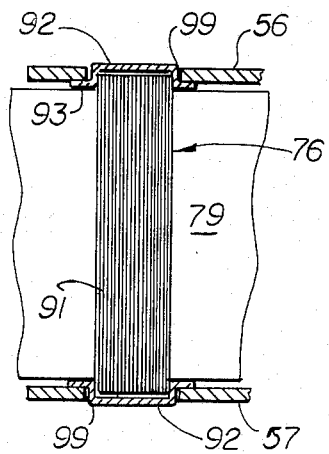
FIG. 3 is a fragmentary sectional view taken substantially along line 3—3 of FIG. 1.
Figure 4:
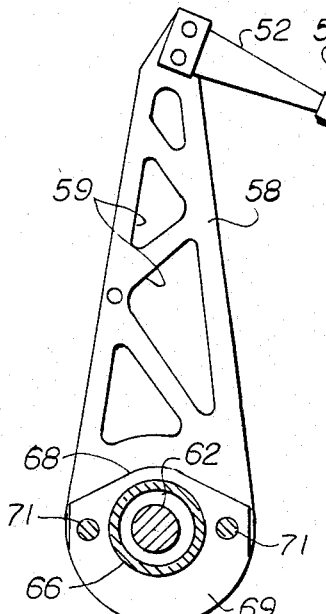
FIG. 4 is a sectional view taken substantially along line 4—4 of FIG. 2.
Figure 5:
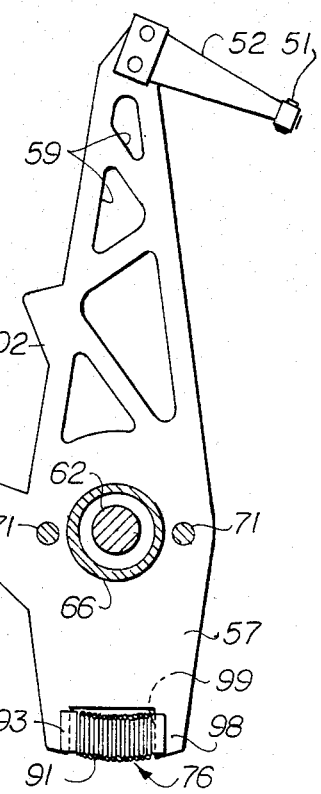
FIG. 5 is a sectional view taken substantially along line 5—5 of FIG. 2.
Figure 6:
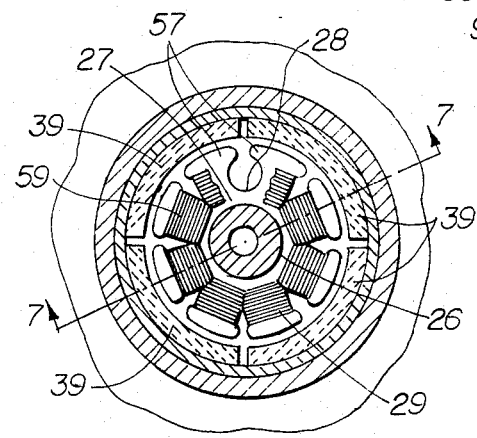
FIG. 6 is a sectional view taken substantially along line 6—6 of FIG. 2.
Figure 7:
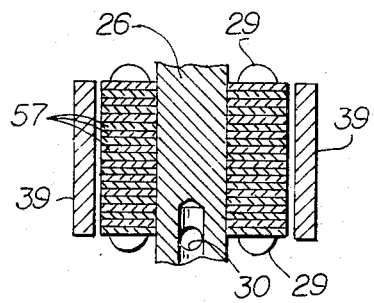
FIG. 7 is a sectional view taken substantially along line 7—7 of FIG. 6.

Mounted in a corner of the base 21 is a "voice coil" motor 86 which actuates all of the arms 56-58. Fastened to the base 21 is a motor frame 77, consisting of vertical radial member 83 from which projects vertical outer pole 78, intermediate or center pole 79 and inner pole 81, each of which is arcuate in shape, having its inner and outer radii concentric with pivot shaft 62. The poles 78, 79 and 81 are radially spaced apart. The lower edges of poles 79 and 81 are elevated above motor frame 67 to provide clearance for the end of 98 of bottom arm 57. On inside of outer pole opposite 78 is outer magnet 86 and on the outside of inner pole 81 is end magnet 87. The ends of the poles opposite member 83 are closed off by end piece 82, which greatly improves the flux-carrying capability, thereby reducing center pole projected area and wasted coil length. Winding 91 shown in detail in FIG. 3 consists of a vertically elongated coil of wire which straddles the center pole 79. The winding 91 is formed around a mandrel (not shown and removed after manufacture of the coil) and permanently held in position having relatively square top and bottom and elongated sides. The top and bottom of coil 91 are held in caps 92 which fit through appropriate holes in arms 56 and 57 and are located by flanges 93. The passage of electric current through the windings 91 in cooperation with the magnetic flux of the permanent magnets 86, 87 causes the winding 91 to provide force in an arcuate path along the center pole 79 and this, in turn, causes the arms 56-58 to rotate around pivot shaft 62.

The ends 96 of intermediate arms 58 are truncated in arcuate shape to clear pole 81. The inner end 97 of top arm 56 is formed with slot 99 which receives the cap 92, while the inner end 98 of bottom arm 57 is formed with a similar slot 99 to receive the corresponding cap 92 at the bottom of winding 91.

Screwed, or otherwise attached, to base 21 is a resilient over-travel bumper 101. Bottom arm 57 has an extension providing two stop surfaces 102 and 103 which engage the bumper 101 to limit the rotary movement of arm 57, and the other arms as well, so that the heads 51 traverse only the portions of the discs 43 which carry recording tracks.

Latch 106 is provided to hold the arms 56-58 stationary during storage or, preferably, at any time when the power to the device is off. For such purpose a frame 107 is attached to the base 21 carrying an electro-magnetic coil 108. Pivotted to frame 107 is a clapper 109 held in outward position by spring 111. The bottom arm 57 is formed with a notch 113 in which the outer end of the clapper 109 fits when the coil 108 is deenergized, preventing movement of arm 57. When the power is on, the coil 108 is energized retracting the clapper 109 so that it disengages the notch 113, permitting the arms 56-58 to rotate under the influence of the motor 76.

What is claimed is:

1. An improved apparatus for positioning read/write heads with respect to rotating disk media in a disk drive comprising:
   an arm assembly including head support means for supporting and positioning read/write heads at a first end of said arm assembly, and actuator support means at a second end of said arm assembly;
   pivot means having a pivot axis for pivotally supporting said arm assembly with respect to said disks, said head support means extending from a first side of said pivot means and said actuator support means extending from a second side of said pivot means;

positioning motor means disposed adjacent to said second end of second arm assembly including:

first and second stationary magnet means; said first and second magnet means each comprising an elongated permanent magnet means having a longitudinal axis and at least one arcuate face; said arcuate face having a central axis of curvature parallel to said longitudinal axis of said permanent magnet means; said arcuate face of said first magnet means being convex; said arcuate face of said second magnet means being concave; the radius of curvature of said concave face of said second magnet means being greater than the radius of curvature of said convex face of said first magnet means;

means for supporting said first and second magnet means such that said axes of curvature of said arcuate faces of said first and second magnet means coincide with said pivot axis of said arm assembly such that said arcuate faces of said first and second magnet means are spaced apart from each other along a radius centered at said pivot axis; and an electromagnetic coil having a cross section with a major axis and a minor axis secured to said actuator support means and disposed between said first and second magnet means such that said major axis is parallel to said pivot axis of said arm assembly;

whereby read/write heads are selectably positionable upon the application of selected electromotive force to said coil.

2. The apparatus of claimed in claim 1 wherein said means for supporting said first and second magnet means comprises a substantially "E"-shaped frame having arcuate pole members spaced apart from each other along a radius centered at said pivot axis of said arm assembly projecting from a base member of said frame, including:

an intermediate arcuate pole member;

an inner arcuate pole member which fixedly supports said first magnet means such that said arcuate face of said magnet means faces said intermediate arcuate pole member;

an outer arcuate pole member which fixedly supports said second magnet means such that said arcuate face of said second magnet means faces said intermediate pole member; and means for affixing said frame in a stationary position with respect to said electromagnetic coil.

3. The apparatus as claimed in claim 2 wherein said substantially "E"-shaped arcuate frame is rigidly affixed to a base of said disk drive.

4. The apparatus as claimed in claim 2 wherein said intermediate pole member is disposed through said electromagnetic coil such that said coil is movable along the arcuate length of at least some portion of said intermediate pole member upon the application of electromotive force to said coil.

5. The apparatus as claimed in claim 2 further comprising a pole member end cap affixed to the ends of said pole members.

6. The apparatus as claimed in claim 1 wherein said electromagnetic coil is substantially rectangular in cross section.

7. The apparatus as claimed in claim 1 wherein said actuator support means comprises an upper arm section and a lower arm section, said sections being vertically separated and rigidly interconnected, each said section having a cut-out portion at the terminus thereof forming a pair of opposing fingers on each said upper and lower arm section for fixedly receiving coil support members to which the transverse ends of said coil are respectively secured.

8. The apparatus as claimed in claim 1 wherein said arm assembly comprises a plurality of spaced apart arms means for supporting and positioning a plurality of associated magnetic heads along the surface of a plurality of rotating spaced apart disks in said disk drive.

9. The apparatus as claimed in claim 8 wherein said arm assembly further comprises counterweight means for balancing said arm assembly with respect to said pivot axis.

10. The apparatus as claimed in claim 9 wherein said counterweight means comprises a plurality of spaced apart counterweight sections interposed and fixedly secured between said plurality of said arm means for statically balancing said arm assembly about said pivot axis, said counter weight sections extending towards said second end of said arm assembly from a plurality of corresponding spacers interposed between said plurality of said arm means adjacent said pivot means.

11. The apparatus as claimed in claim 1 wherein said pivot means comprises a pivot shaft securely mounted substantially perpendicular to base of said disk drive and pivotally engaged with a corresponding pivot aperture defined in said arm assembly between said head support means and said actuator support means.

12. The apparatus as claimed in claim 1 further comprising arm assembly limit means for limiting the rotation of said arm assembly whereby the travel range of said read/write heads is limited to a preselected radial distance across the surface of said disks.

13. The apparatus as claimed in claim 1 further comprising means for latchably constraining said arm assembly with respect to a base of said disk drive, said latch means being ridigly interconnected to said arm assembly and said base of said disk drive upon latchable engagement thereof.

14. An improved actuator motor for selectively positioning a read/write positioning assembly in a disk drive including rotating disk media, read/write heads for traversing the surface thereof and reading and writing information thereto, and a movable positioning arm assembly connected to said read/write heads for locating said heads across the surface of said rotating disk media comprising:

an actuator arm means for interconnection with said positioning arm assembly;

pivot means having a pivot axis for pivotably supporting said actuator arm means and said positioning arm assembly such that said positioning arm assembly projects from a first side of said pivot means and said actuator arm means projects from a second side of said pivot means;

first and second stationary magnet means; said first and second magnet means each comprising an elongated permanent magnet means having a longitudinal axis and a least one arcuate face said arcuate face having an axis of curvature parallel to said longitudinal axis of said permanent magnet means; said arcuate face of said first magnet means being convex; said arcuate face of said second magnet means being concave; the radius of curvature of said concave of face said second magnet means being greater than the radius of curvature of said convex face of said first magnet means;

means for supporting said first and second magnet means such that said axes of curvature of said arcuate faces of said first and second magnet means coincide with said pivot axis of said arm assembly such that said arcuate faces of said first and second magnet means are spaced apart from each other along a radius centered at said pivot axis; and an electromagnetic coil having a cross section with a major axis and a minor axis secured to said actuator arms means and disposed between said first and second magnet means such that said major axis is substantially parallel to said pivot axis.

15. The apparatus as claimed in claim 14 wherein said means for supporting said first and second magnet means comprises a substantially "e"-shaped arcuate frame having arcuate pole members spaced apart from each other along a radius centered at said pivot axis including:

an intermediate arcuate pole member disposed through said electromagnetic coil such that said coil is movable along the arcuate length of at least some portion of said intermediate pole member;

an inner arcuate pole member which supports said first magnet means such that said arcuate face of said first magnet means faces said intermediate pole member;

and an outer arcuate pole member which supports said second magnet means such that said arcuate face of said second magnet means faces said intermediate pole member, whereby said electromagnetic coil is selectively positioned along said intermediate pole member upon the application off a selected motor force to said coil.

16. The apparatus as claimed in claim 15 wherein said electromagnetic coil is substantially rectangular in cross section.

17. A head actuator arm assembly including a first end and a second end, said first end including head support means extending therefrom affixed for supporting read/write heads;

pivot means disposed between said first and said second end of said head actuator arm assembly having a pivot axis for pivotally supporting said arm assembly with respect to said disks;

coil support means extending from said second end of said actuator arm assembly having an electromagnetic coil wound thereon; means including at least one substantially arcuate magnet, the arcuate surface thereof being the primary operative surface of said magnet providing an electromagnetic field in which said electromagnetic coil moves;

whereby said read/write heads are selectably positionable with respect to said rotating disk media upon the application of electromotive force to said coil.

* * * * *

UNITED STATES PATENT AND TRADEMARK OFFICE
CERTIFICATE OF CORRECTION

PATENT NO. : 4,805,055
DATED : February 14, 1989
INVENTOR(S) : Wright

It is certified that error appears in the above-identified patent and that said Letters Patent is hereby corrected as shown below:

On the title page:

Item [73]  , under "Assignee:", after "Maxtor", insert --Corporation--.
Item [62]  , under "Related U.S. Application Data", delete "1986" and insert place thereof --1982--.
In column 1, line 5, delete "(divisional)" and insert in place thereof --divisional--.
In column 1, line 6, delete "11/24/86" and insert in place thereof --11/24/82--.
In column 2, line 55, delete "enclosed" and insert in place thereof --enclosing--.
In column 3, line 44, delete "if" and insert in place thereof --in--.
In column 4, line 13, after the word "end", delete "of".
In column 5, line 33, delete "of" and insert in place thereof "as".
In column 6, line 8, delete "arms" and insert in place thereof "arm".
In column 7, line 18, delete "'e'-shaped" and insert in place thereof --"E"-shaped--.
In column 8, line 6, delete "off" and insert in place thereof --of--.

Signed and Sealed this

Twenty-sixth Day of October, 1993

Attest:

BRUCE LEHMAN

Attesting Officer

Commissioner of Patents and Trademarks